W. K. RICHARDSON.
LIQUID PACKING.
APPLICATION FILED MAY 12, 1911.
1,014,850.
Patented Jan. 16, 1912.
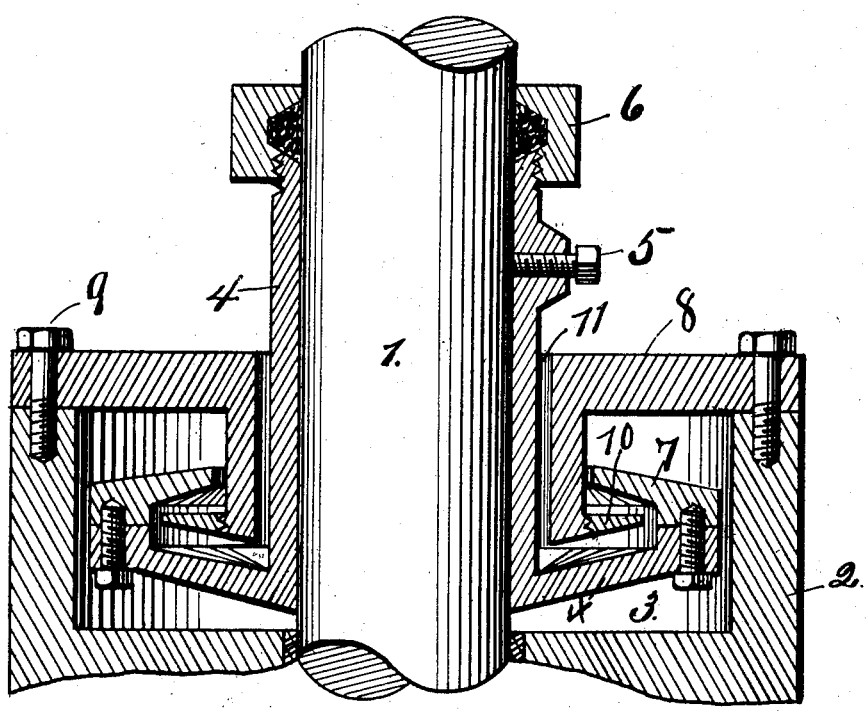
Witnesses
M. L. Richardson
M. K. Richardson
Inventor,
William K. Richardson

UNITED STATES PATENT OFFICE.

WILLIAM K. RICHARDSON, OF LEAVENWORTH, KANSAS.

LIQUID PACKING.

1,014,850. Specification of Letters Patent. Patented Jan. 16, 1912.

Application filed May 12, 1911. Serial No. 626,848.

*To all whom it may concern:*

Be it known that I, WILLIAM K. RICHARDSON, a citizen of the United States, residing at Leavenworth, in the county of Leavenworth and State of Kansas, have invented a new and useful Liquid Packing, of which the following is a specification.

This invention relates to a liquid packing for rotary shafts and centrifugal machines. The object of the invention is to produce a packing that will hermetically seal the passage between the rotary and stationary members of a machine where internal or external pressure is to be confined, to prevent heating of the parts requiring a packing, and other objects hereinafter described and claimed. I attain these objects by the mechanism illustrated in the accompanying drawing which is a vertical cross-section of the entire apparatus.

1, indicates a vertical shaft; 2, indicates a stationary member of a machine equipped with a rotary shaft, said member 2, having a central recess 3, through which the shaft extends.

4, indicates a thimble, which slips over shaft 1, and is retained in position after adjustment by set-screw 5, the upper end of the thimble being threaded for the reception of packing gland 6, and is for the purpose of preventing the passage of a fluid between the shaft 1, and the thimble 4, the lower portion of member 4, has an upward inclined annular projection to which is bolted the centrally perforated disk 7, forming a V shaped pocket or chamber.

8, indicates a gland, which acts as a cover to chamber 3, and is retained in position by bolts 9, said gland having a downward flange at its perforation, and provided with a left hand thread on its lower periphery for the reception of ring 10. The central perforation of gland 8, is sufficiently large to leave a clearance 11, between the thimble 4, and the downward flange of member 8, that these two members may never come in metal contact.

Mercury, water, or oil may be used, in the apparatus, depending upon the conditions of service, speed of the machine, and size of the thimble.

The operation of the device is as follows: The liquid used is introduced into the V shaped chamber by pouring it in the clearance 11, when the machine is in operation centrifugal force holds the liquid to the outer extremity of the V shaped pocket; if external pressure is to be resisted, such as atmospheric pressure, due to a vacuum within the machine, atmospheric pressure tends to force air through the clearance passage 11, between members 4 and 8, driving a portion of the liquid in the passage formed by members 4 and 10, toward the periphery of disk 10, thus shortening the column of liquid on the lower side of 10, and increasing it on the upper side, the longer column of liquid being acted upon by centrifugal force alone, on the other side, counter-balanced by a shallow or less length of liquid, acted upon by the components, centrifugal force and atmospheric pressure, said atmospheric pressure corresponding to the degree of vacuum sustained within the machine. Should this device be employed to resist internal pressure, the fluid escaping into chamber 3, through the journal bearing of member 2, in contact with shaft 1, the pressure in chamber 3 will drive the column of liquid on the upper side of disk 10 toward its periphery, thereby lessening the length of this column and correspondingly increasing the column of liquid on the lower side of the disk until there is an equilibrium established between the longer column which is acted upon by centrifugal force alone, and the shorter column which is acted upon by the components, internal pressure and centrifugal force.

This device provides a perfect seal, conserves power, and makes practical high speed machines, and there is no wear or heating of the parts where any of the present means are employed to accomplish the same results.

This device is shown in my co-pending application Serial No. 597,581, centrifugal water clarifier, but not therein specifically claimed.

What I claim is:

1. A liquid packing, which consists of a bifurcated recess adapted to contain a liquid, said recess extending from points less removed to points more removed from the center of rotation, and surrounding a stationary member, said liquid being subjected to centrifugal force whereby it will hermetically seal the bifurcated recess to the passage of a fluid under pressure, substantially as described.

2. A liquid packing, comprising a thimble adapted to receive a rotary member and turned therewith, said thimble having an annular projection, to which is secured a disk, in a manner to form an annular chamber adapted to contain a fluid, and also adapted to receive a stationary centrally perforated disk, secured upon a flange of the cover to the chamber in which the greater end of the thimble rotates, effecting a seal against internal, or external pressure, in the presence of centrifugal force.

WILLIAM K. RICHARDSON.

Witnesses:
M. L. RICHARDSON,
F. L. McGAHEN.